United States Patent [19]

Corey

[11] 4,402,304

[45] Sep. 6, 1983

[54] SULFUR MELTING APPARATUS AND METHOD

[76] Inventor: Jan M. Corey, 39 W. 6th Ave., Mesa, Ariz. 85202

[21] Appl. No.: 303,908

[22] Filed: Sep. 21, 1981

Related U.S. Application Data

[63] Continuation of Ser. No. 52,959, Jun. 29, 1979, abandoned.

[51] Int. Cl.³ .................................................. F24H 1/00
[52] U.S. Cl. .............................. 126/343.5 A; 217/421; 222/146 HE; 432/229
[58] Field of Search ............... 126/343.5 A, 343.5 R; 37/12; 432/13, 185, 229; 219/421; 23/308 S; 423/578 R; 222/146 HS, 146 HE, 261, 262

[56] References Cited

U.S. PATENT DOCUMENTS

| | | | |
|---|---|---|---|
| 1,993,973 | 3/1935 | McNeil | 126/343.5 A |
| 2,809,772 | 10/1957 | Weisz | 222/146 HE |
| 3,080,863 | 3/1963 | Stolle | 126/343.5 A |
| 3,282,469 | 11/1966 | Skonberg | 222/146 HE |
| 4,027,656 | 6/1977 | Geddes et al. | 126/343.5 A |
| 4,195,755 | 4/1980 | Slautterback et al. | 219/421 |

*Primary Examiner*—Samuel Scott
*Assistant Examiner*—Randall L. Green
*Attorney, Agent, or Firm*—Cahill, Sutton & Thomas

[57] ABSTRACT

A high efficiency sulfur melting system includes a melting vat having a heated platen. The platen has a waffled surface. A piston exerts pressure on powdered sulfur contained in the melting vat, forcing the powdered sulfur into intimate contact with the surface of the heated platen. The platen contains a large number of seepage holes. Powdered sulfur in intimate contact with the surface of the heated platen melts. The melted sulfur is immediately forced into the seepage holes by pressure from the piston. The melted sulfur is forced through the seepage holes into a collecting device.

5 Claims, 5 Drawing Figures

SULFUR MELTING APPARATUS AND METHOD

This is a continuation, of application, Ser. No. 052,959, filed June 29, 1979, now abandoned.

BACKGROUND OF THE INVENTION

1. Field of the Invention

The invention relates to methods and portable apparatus for efficiently melting sulfur.

2. Description of the Prior Art

A variety of methods and apparatus have been proposed for melting sulfur or extracting sulfur from ore. The proposed systems utilize various types of hoppers into which the sulfur bearing ore is dumped and gravity feed systems whereby the sulfur passes through chambers having heated walls or chambers containing hot water or steam to accomplish melting of the sulfur.

For example, U.S. Pat. No. 4,027,656 discloses a system in which solid sulfur is gravity fed into one or more heated vertical sulfur melt tubes. The solid sulfur is maintained within the tubes by means of an external heated plate disposed at a lower end of the melt tubes. The overburden weight of the sulfur within the hopper forces the sulfur into the tubes and against the heated walls of the tubes, whereat the sulfur melts and flows due to gravity in liquid form downward along the walled surfaces of the melt tubes. The melted sulfur is conducted into a heated trough and is conveyed in liquid form for storage or use. Reliance on overburden to produce the pressure forcing the sulfur against the heated walls and bottom results in a very tall hopper requiring expensive equipment to fill the hopper. Due to varying overburden, the pressure and hence the melting rate, varies substantially.

U.S. Pat. No. 1,512,230 discloses a system for extracting sulfur from ore. This system includes a pressurized chamber into which steam and/or hot water are injected after the chamber has been loaded with sulfur ore. The chamber has a bottom plate having a number of annular grooves therein. A plurality of discharge openings are disposed along bottoms of the annular grooves. The hot water and steam melts sulfur from the ore. A screen performs the function of filtering debris from raw ore. Melted sulfur is forced through the screen by the steam process. Sulfur flows from the discharge openings into a collecting funnel.

U.S. Pat. No. 3,838,979 discloses a system in which sulfur is recovered from ore which is heated within a sulfur recovery vessel to produce sulfur vapor. The sulfur vapor is then condensed within the vessel by direct contact with cold incoming ore. The sulfur product is collected from the condensed sulfur vapor and remaining gases recycled to the vessel.

U.S. Pat. No. 1,993,973 discloses a sulfur melting system including a hopper into which pulverized sulfur is loaded. A perforated retaining member or grate is provided at the bottom of the hopper, beneath which a trough is disposed. Steam heated coils heat the trough and the retaining member, and further heat the sulfur by radiation so that sulfur melts, then falls into the heated trough, and can be removed in liquid form for use or storage.

None of the above systems for melting sulfur are efficient due to the fact that when sulfur comes in contact with a heated surface, it melts readily, but the melted sulfur acts as an excellent insulator which prevents further melting of sulfur which is not in immediate intimate contact with the heated surface of the melting chamber.

Accordingly, it is an object of the invention to provide a system for melting sulfur more effectively than the systems of the known prior art.

It is yet another object of the invention to provide a sulfur melting system which transfers heat from a heater to sulfur more efficiently than prior sulfur melting systems.

Still another object of the invention is to provide a low cost sulfur melting apparatus which produces melted sulfur at a high rate.

A further object of the invention is to provide a sulfur melting system which more uniformly melts sulfur than prior sulfur melting systems.

A yet further object of the invention is to provide a low cost, portable efficient sulfur melting system which can be utilized to melt powdered sulfur for use in various field and construction activities.

The sulfur melting systems of the prior art require gravity flow systems or pumps to convey melted sulfur to a storage container or utilization device, adding expense to the systems.

Therefore, a still further object of the invention is to provide a sulfur melting system which obviates the need for gravity flow or pump-type melted sulfur removal systems.

A novelty search directed to the present invention uncovered, in addition to the above mentioned patents, U.S. Pat. Nos. 1,508,355, 2,149,373, 1,713,543, 3,594,416 directed to various melting systems and U.S. Pat. Nos. 3,501,890, 3,589,276 and 4,041,123 directed to various compacting apparatus.

SUMMARY OF THE INVENTION

Briefly described, and in accordance with one embodiment thereof, the invention provides a system for melting flaked, prilled, granular, or particulate sulfur including a chamber into which a predetermined amount of the sulfur can be loaded. The chamber is at least partially bounded by a heated surface which delivers heat at a sufficiently high temperature to melt sulfur in contact with the heated surface. Force is applied to compress the sulfur in the chamber, forcing the particles of sulfur against the heated bounding surface.

In the described embodiment of the invention, the chamber includes bounding side walls and a piston. The pressure is applied to sulfur contained in the chamber by means of the piston and a pneumatic cylinder which moves the piston. A plurality of seepage holes are contained in a portion of the heated bounding surface. The pressure applied to the piston is selected to optimize melting of sulfur at the interface between the sulfur and the heated surface and to force melted sulfur out of the chamber through the seepage holes immediately after the sulfur melts.

In the described embodiment of the invention, the bottom of the chamber is formed by a heated platen having a waffled surface which greatly increases the surface area of the heated platen, thereby increasing the amount of sulfur in contact with the heated surface and hence increasing the amount of sulfur melted. The interior portions of the heated platen are heated to a temperature in the range of approximately 310° F. Increasing the pressure applied to the sulfur in the chamber greatly increases the melting rate of sulfur in the chamber for pressures up to approximately eight to twelve pounds per square inch, and increases the melting rate to a lesser extent for pressures in excess of the range. The temperature of the surface of the heating platen in contact with the sulfur remains at a temperature only slightly above the melting point of sulfur, since at the optimum sulfur pressure heat is removed from the heated platen as fast as it is injected therein by means of heating elements or fluids in the center of the heating platen.

DESCRIPTION OF THE INVENTION

Figure 1:
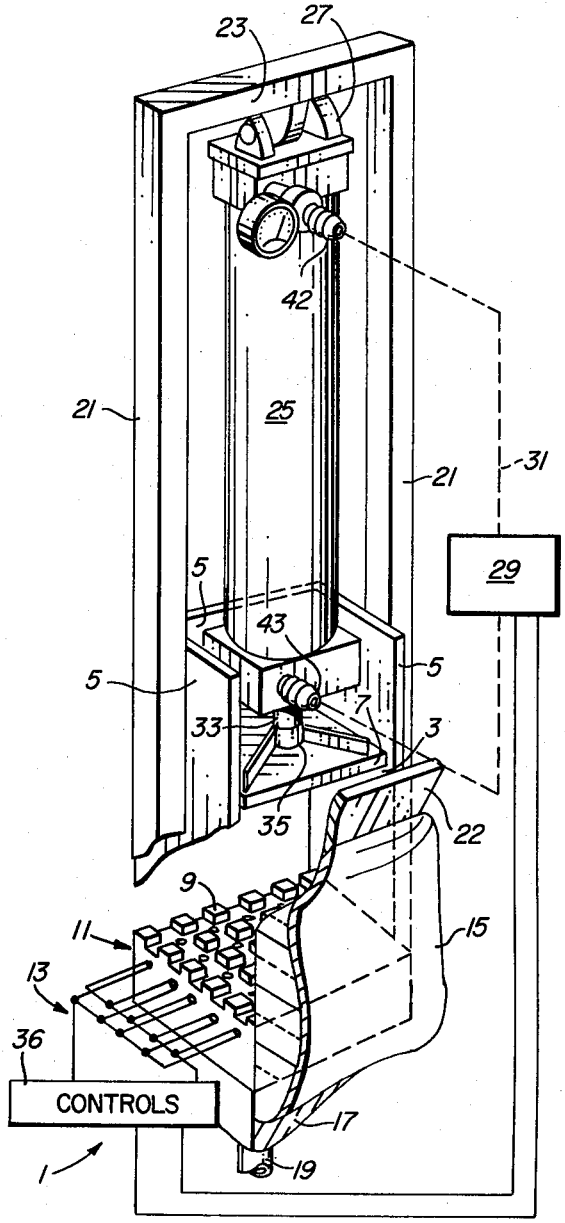
FIG. 1 is a partial cutaway perspective view of one embodiment of the sulfur melting system of the present invention.

Referring to FIG. 1, sulfur melting system 1 includes a chamber or cylinder 3 into which powdered, prilled, or granular sulfur is loaded and then compressed by means of piston 7, as subsequently explained. Chamber 3 is bounded by four side walls 5 and a bottom heated platen 11 to form a rectangular cavity.

When piston 7 is in its maximum raised position, powdered sulfur can be loaded into chamber 3 through the gap which exists between piston 7 and lip 22. Lip 22 is a sloping upper extension of the front side wall bounding chamber 3 and aids loading of powdered sulfur into chamber 3. When the chamber 3 is loaded with powdered sulfur, piston 7 slides along the inner surfaces of the side walls 5, closing the gap between piston 7 and lip 22, and compresses the powdered sulfur in chamber 3 against the surface of heated platen 11.

Still referring to FIG. 1, the upper surface of heated platen 11 is waffled. The surface contains two sets of spaced parallel grooves which form a grid of cubical islands. This has the effect of greatly increasing the surface area of the upper surface of heated platen 11, thereby increasing the amount of heated surface area contacting powdered sulfur in chamber 3.

In the described embodiment of the invention, heated platen 11 is made of aluminum, and is approximately six inches square. The cubical islands are approximately four tenths of an inch on each side and are spaced approximately four tenths of an inch apart. The depth of chamber 3 is approximately twelve inches.

Figure 2:
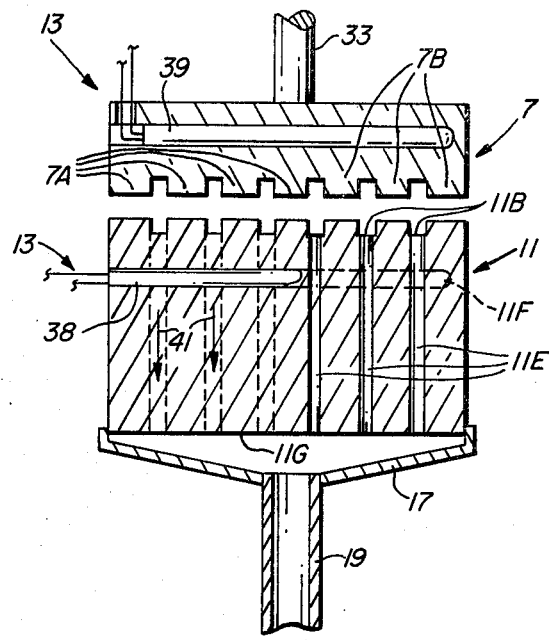
FIG. 2 is a partial sectional view of the heating platen 11 of the embodiment of FIG. 1.
Figure 3:
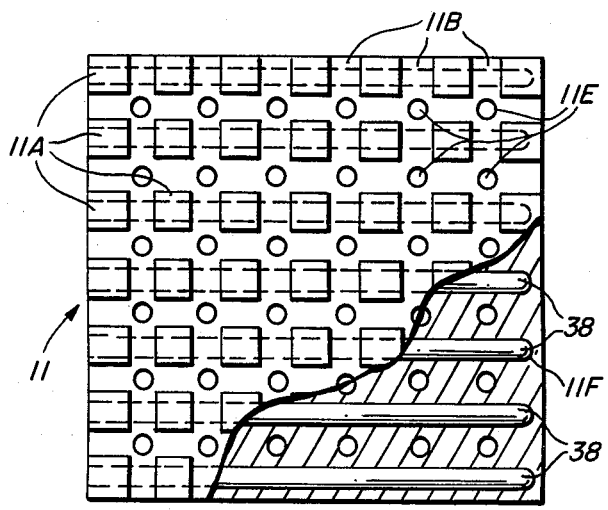
FIG. 3 is a partial top view of the heating platen 11 of FIG. 1.

Referring also to FIGS. 2 and 3, the islands forming the upper waffled surface are designated by reference numeral 11A, and the grooves separating the island are designated by reference numeral 11B. The heated platen 11 is heated by means of a plurality of heating elements 38 embedded in horizontal parallel holes in 11F in heated platen 11. Heating elements 38 may be heating elements identified by the trademark CALRODS and are manufactured by General Electric Corporation. Electrical power is conducted to the respective heating rods 38 by means of a pair of electrical conductors 13. The temperature of the heating element is controlled by means of a conventional electrical control unit 36. The details of temperature control unit 36 can be readily provided by those skilled in the art, and the details therefore are not described herein.

Referring still to FIGS. 2 and 3, a plurality of vertical seepage holes 11E are disposed in heated platen 11. The respective seepage holes extend from the bottoms of the respective grooves 11E to the lower surface 11G.

Referring now to both FIGS. 1 and 2, a collector or funnel 17 is sealably attached to the bottom of heated platen 11. An outlet tube 19 is connected to the bottom of funnel 17.

In order to prevent loss of heat energy to the surroundings, an insulating blanket 15 is wrapped around the walls forming chamber 3, as shown in FIG. 1.

Referring to FIG. 1, piston 7 is raised and lowered by means of a pneumatic cylinder 25. Pneumatic cylinder 25 is attached at its upper end by means of mount 27, which is attached to cross bar 23. Cross bar 23 is supported by a pair of upright frame members 21 which are rigidly positioned with respect to cylinder side walls 5. The movable rod 33 of pneumatic cylinder 25 is rigidly attached to piston 7 by means of a rigid mounting collar 35.

Pneumatic pressure is applied at the upper and lower ends of pneumatic cylinder 25 through ports 42 and 43 by means of a pressure control system 29. Dotted lines 31 schematically represent pneumatic tubes connected to ports 42.

Those skilled in the art can readily obtain various liquid or air pressure control systems which are readily available commercially and attach them to pneumatic cylinder 25 in the manner indicated. The details therefore are not shown herein. Either a pressurized air system or a pressurized fluid system can be operated to raise piston 7 or to lower it to apply the desired amount of downward force to powdered sulfur contained in chamber 3. However, air pressure systems are more economical.

Figure 4:
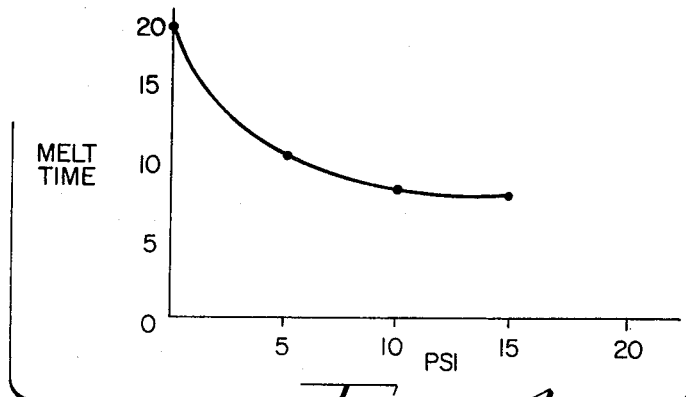
FIG. 4 is a graph illustrating the melt time for a predetermined quantity of powdered sulfur as a function of pressure applied to powdered sulfur for the sulfur melting system of FIG. 1.

In accordance with the present invention, it has been found that when the interior of heated platen 11 is heated to 310° F. and chamber 3 is filled with 8½ lbs. of powdered sulfur, the amount of time required to completely melt the sulfur for various pressures applied by piston 7 on the sulfur contained in chamber 3 is given by the graph in FIG. 4. It can be seen that increasing the pressure to a level in the vicinity of approximately 7–9 lbs. per square inch results in a sharp reduction in the total melting time of the 8½ lbs of sulfur. The portion of the curve in FIG. 4 to the left of the dot that indicates a pressure of five pounds per square inch is much steeper than the portion of the curve to the right of that dot, indicating that as a practical matter, the applied pressure should be at least five pounds per square inch.

The great improvement in melting efficiency is believed to result from the following factors. First, the pressure of piston 7 upon the powdered sulfur in chamber 3 results in very close, intimate contact of powdered sulfur particles adjacent to the heated upper surface of platen 11. The greatly increased surface area due to the waffled surface structure of heated platen 11 increases the amount of sulfur to platen surface contact, thereby increasing the amount of sulfur in intimate contact with the hot surface of platen 11. Particles of powdered sulfur in such intimate contact with the heated platen surface immediately melt, but tend to insulate adjacent unmelted sulfur from heated platen 11, since melted sulfur is a poor heat conductor. The pressure in the powdered sulfur in chamber 3 can be maintained at a level which is nearly uniform (within approximately one percent) throughout chamber 3.

The pressure within the powdered sulfur (produced by the downward force applied by piston 7) causes the melted sulfur at the platen-sulfur interface to flow immediately into the various adjacent grooves 11B and from there into the various vertical seepage holes 11E. Further melting of the sulfur occurs as it flows along the surfaces of grooves 11B and the seepage holes 11E. Melted sulfur is forced out of chamber 3 by the pressure of the powdered sulfur, allowing an adjacent dense, compacted layer of unmelted sulfur particles to be forced into intimate contact with the hot surface of platen 11, greatly increasing the efficiency of transferring heat from platen 11 to the sulfur and thereby greatly hastening the melting process.

The melted sulfur forced out of the bottom of seepage holes 11E is collected in the chamber formed by funnel 13 and is forced out of outlet pipe 19.

It should be noted that since the melted sulfur is forced out of the outlet pipe 19, the need for a pump or gravity flow system for liquid sulfur removal in some cases is obviated.

The above described system is capable of producing one pound of liquid sulfur per minute with a six inch square platen, with a power consumption of nine amperes at 120 volts, or one thousand eighty watts which is equal to 3693 BTU (British Thermal Units). Tests show that the prototype described with reference to FIG. 1 loses approximately 1,230 BTU to the atmosphere through radiation, leaving approximately 2460 BTU utilized for melting of sulfur. This represents a high efficiency for a small, inexpensive sulfur melting machine such as the one described herein.

Figure 5:
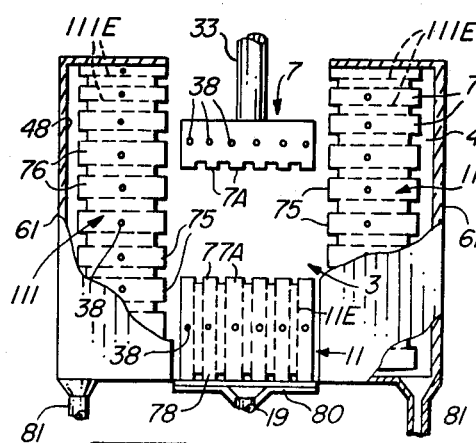
FIG. 5 is a partial cutaway view of an alternate embodiment of the sulfur melting system of the present invention.

Referring now to FIG. 5, the efficiency of the device shown in FIG. 1 can be increased by providing heating elements 38 in piston 7, and by providing a waffled lower surface having island 7A thereon. Piston 7 is heated to the same temperature as platen 11. Walls 5 of FIG. 1 are replaced by heated walls 111, which each contain a plurality of heating elements 38. Each of the heated wall elements 111 has a waffled inner surface which contacts the edges of piston 7 and includes a plurality of spaced cubic islands 75. A plurality of horizontal seepage holes 111E are disposed in each of vertical heating elements 111. Alternatively, seepage hole 111E need not be horizontal, but can be sloped downward from the inner surfaces of vertical heating elements 111 to allow melted sulfur to flow into chambers 48 due to gravity.

Chambers 48 are formed between the outer waffled surfaces of vertical heating elements 111 and outer walls 61.

It should be noted that a plurality of heating elements 38 are also disposed in each of the vertical heating elements 111. These heating elements can be the CAL-RODS described above. Melted sulfur which flows into chambers 48 flows to the bottom of chambers 48 and out of outlet tubes 81, thereby carrying melted sulfur to a suitable collection or utilization device.

In FIG. 5, the bottom surface of platen 11 is also waffled. The collection device 80 is not cone-shaped or funnel shaped as is funnel 17 of FIG. 1, but instead, lies close to the lower waffled surface. The lower waffled surface of platen 11 provides continued transfer of heat from platen 11 to the already melted sulfur which has passed through seepage holes 111E, further elevating its temperature to insure that the sulfur remains liquid as it is conducted out of outlet pipe 19.

Providing of the above described vertical heating elements 111 and heated piston 7 in the embodiment of FIG. 5 increases the melting rate of sulfur contained in chamber 3. Sulfur melted along the waffled surfaces of piston 7 and the inner walls of vertical heating elements 111 is forced outward through seepage holes 111E due to the pressure in the powdered or prilled sulfur in chamber 3, caused by the downward force on piston 7. The outer waffled surfaces of heating elements 111 tend to further elevate the temperature of the already melted sulfur, preventing it from crystalizing as it is exhausted via outlets 81.

While the invention has been described with reference to several particular embodiments thereof, those skilled in the art readily will recognize that variations in the described structure may be made within the true spirit and scope of the invention as set forth in the appended claims. For example, the cylinder or chamber 3 may be round instead of square. Various different arrangements for producing a downward force on the piston can be utilized. The recited dimensions can be varied to produce much larger or even smaller devices. Various conventional heating elements, including gas, steam, water, oil, etc., can be utilized instead of the described electrical heating elements. It should be noted that although the use of piston 7 to force sulfur particles against the bottom of heated platen 11 in the disclosed and described embodiment of the invention results in a dramatic increase in sulfur melting rate for pressures within the sulfur is in the range from seven to nine pounds per square inch, substantial improvements in sulfur melting rates are realized by the disclosed structure even without use of the piston 7 and cylinder 25. The weight of sulfur in chamber 3 provides enough pressure forcing the bottom layer of sulfur particles into intimate contact with the surface of heated platen 11 to cause melting of that layer of sulfur particles. The presence of nearby seepage holes 11E permits rapid removal of melted sulfur, allowing the next layer of sulfur particles to be immediately pressed into intimate contact with the hot surface of heated platen 11. The resulting sulfur melting rate, while not as great as when additional pressure is applied by piston 7, is nevertheless substantially greater than that attained by any known prior sulfur melting system.

I claim:

1. A system for rapidly melting prilled or granular solid sulfur, said system comprising in combination:
   (a) a chamber into which a predetermined amount of said solid sulfur can be loaded, said chamber being bounded at one end by a bounding surface;
   (b) force producing means for applying force tending to compress said solid sulfur in said chamber, forcing pieces of said solid sulfur against said bounding surface, said force producing means including a piston and means for forcing said piston against said solid sulfur, said means for forcing said piston causing said piston to exert at least approximately five pounds per square inch on solid sulfur in said chamber;
   (c) heating means for heating a first portion of said bounding surface to a temperature which causes melting of solid sulfur pieces pressed against said first portion of said bounding surface to produce liquid sulfur, said first portion of said bounding surface having first and second sets of parallel grooves therein producing a waffled surface, the grooves of said first set being non-parallel to the grooves of said second set, there being a sufficient number of said grooves, and each of said grooves being sufficiently deep, to effectuate a predetermined rate of transfer of heat from said bounding surface to solid sulfur in said chamber;

(d) a plurality of seepage holes in said grooves in said first portion of said bounding surface, said force forcing said liquid sulfur out of said chamber through said seepage holes to allow more of said solid sulfur to be pressed against said first portion of said bounding surface and melted by heat from said first portion of said bounding surface, said force producing means being sufficiently great in diameter, and there being a sufficiently large number of said seepage holes disposed sufficiently close to each other to ensure that the low thermal conductivity of melted sulfur between said first portion of a bounding surface and said solid surface of said bounding surface does not substantially insulate said pieces of solid sulfur from heat conducted from said first portion of said bounding surface, wherein said piston has an inner surface containing a plurality of grooves to increase surface area of said piston contacting solid sulfur in said chamber, said system including second heating means for heating said piston; and (e) means for heating the walls of said chamber, said walls containing a plurality of grooves to increase the surface area of said walls contacting solid sulfur in the chamber to improve transfer of heat from said heated walls to said sulfur.

2. The system of claim 1 wherein said force producing means includes a pneumatic cylinder having one end coupled to a rigid support and the other end connected to said piston.

3. The system of claim 2 further including an insulation blanket disposed around said chamber to prevent loss of heat from said chamber.

4. The system of claim 1 further including liquid sulfur collecting means for receiving liquid sulfur forced out of said seepage holes in response to said forcing of said piston against said solid sulfur.

5. The system of claim 1 further including a plurality of seepage holes in said walls extending from bottoms of said grooves in said walls to exterior surfaces of said walls to permit sulfur melted along the inner surfaces of said walls to be forced out of said chamber through said seepage holes in said walls.

* * * * *